March 23, 1954
G. E. DUNN
2,672,740
CONSTANT VELOCITY UNIVERSAL JOINT
Filed Feb. 8, 1952
2 Sheets-Sheet 2
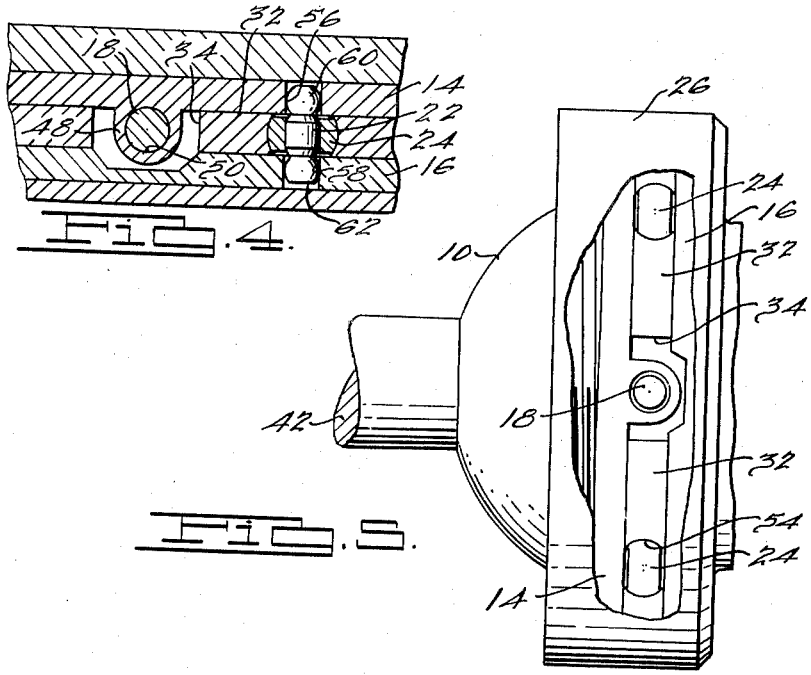
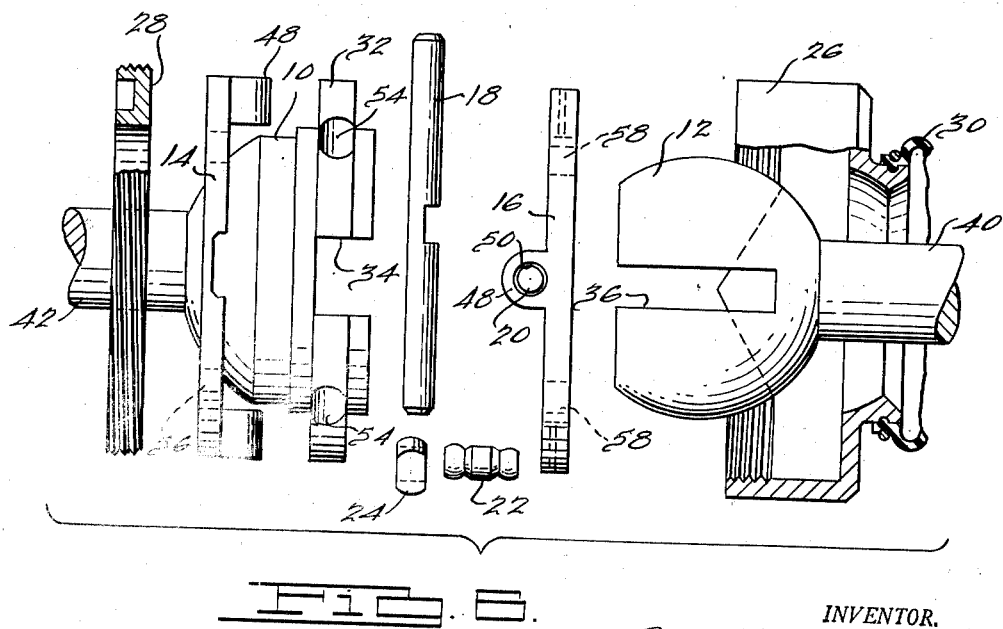
INVENTOR.
George E. Dunn.
BY
ATTORNEY Patented Mar. 23, 1954

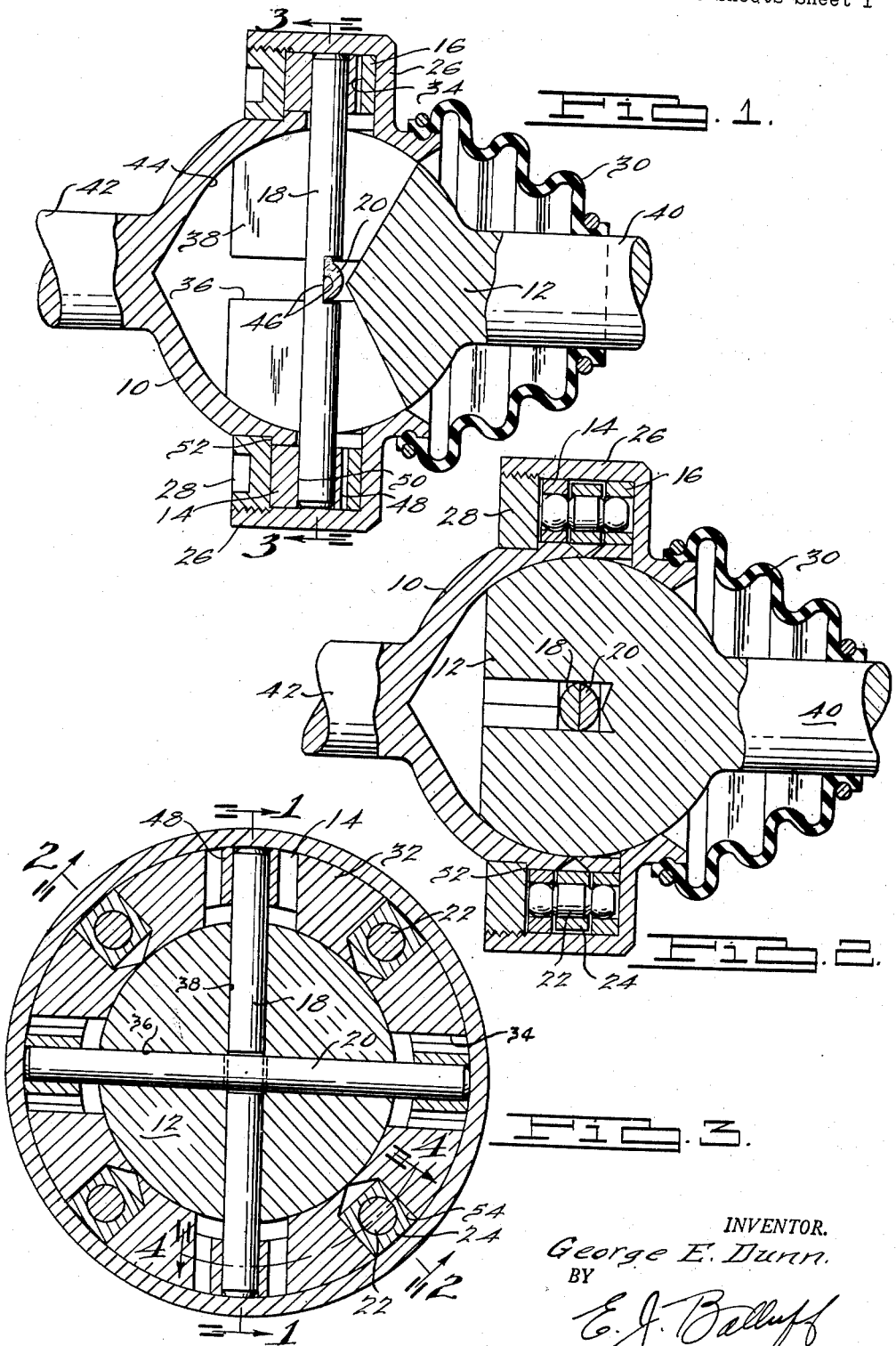

2,672,740

UNITED STATES PATENT OFFICE 2,672,740

CONSTANT VELOCITY UNIVERSAL JOINT

George E. Dunn, Dearborn, Mich., assignor to Universal Products Company, Inc., Dearborn, Mich., a corporation of Delaware Application February 8, 1952, Serial No. 270,583

5 Claims. (Cl. 64—21)

This invention relates to universal joints and has particular reference to a universal joint having constant velocity characteristics.

Universal joints of this type now in use are not self-contained in that they usually require a separate housing and in addition they are not suitable for high speed operation; that is, at speeds of the order of 4000 R. P. M. and higher. The joint construction herein disclosed is self-contained in that no additional housing is required, and in addition its construction is such that it is suitable for high speed operation. The joint construction herein disclosed is additionally characterized by its simplicity of design.

The principal object of the invention, therefore, is to provide a new and improved construction for universal joints of the constant velocity type.

Other and further objects of the invention will be apparent from the following description and claims and may be understood by reference to the accompanying drawings, of which there are two sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a longitudinal sectional view of a joint embodying my invention taken generally along the line 1—1 of Fig. 3;

Fig. 2 is a longitudinal sectional view taken generally along the line 2—2 of Fig. 3;

Fig. 3 is a cross sectional view taken generally along the line 3—3 of Fig. 1;

Fig. 4 is a fragmentary developed sectional view taken along the line 4—4 of Fig. 3;

Fig. 5 is a side elevational view with parts broken away; and

Fig. 6 is an exploded view.

As shown in Fig. 6, a joint embodying my invention comprises in general a socket or body member 10, a ball head 12, compensating rings 14 and 16, cross pins 18 and 20, a series of compensating levers 22, bearings 24 for the compensating levers, and a housing comprising a cover 26, a cover nut 28, and a boot 30.

The socket member 10 is provided with an annular rib or flange 32 and with a series of radially extending slots 34. The ball head 12 is provided with a pair of intersecting, axially extending, diametral slots 36 and 38 disposed at right angles to each other and to the axis of rotation of the ball head 12. The ball head 12 is integrally joined to a shaft 40 and the socket member 10 is integrally joined to a shaft 42, the shafts 40 and 42 each being mounted so as to rotate about its respective axis.

As shown in Fig. 1, the ball head 12 is swiveled and centered in the socket 44 formed in the member 10. Cross pin 18 extends through slot 38 in the ball head 12 and has its ends projecting into slots 34 in the socket member 10. Cross pin 20 extends through slot 36 and projects therebeyond into slots 34 in the socket member 10. The pins 18 and 20 are arranged crosswise of each other, and each of the pins is notched at its middle as indicated at 46 so as to accommodate the other of the pins, and the notched portions of the pins are seated against each other so that the pins lie in a common plane.

The slots 34 are greater in size than the projecting ends of the pins 18 and 20 so as to permit angular movement of the ends of the pins relative to the socket member due to the scissoring action of the pins 18 and 20 when the shafts 40 and 42 are rotating about axes disposed at an angle relative to each other. The ends of the pin 18 are secured to the compensating ring 14, while the ends of the pin 20 are secured to the compensating ring 16. The compensating rings 14 and 16 are each provided with laterally projecting lugs 48 each provided with a bore 50 into which one end of a pin extends. The ends of the pins 18 and 20 are each rotatably or fixedly secured in their respective bores 50 in the compensating rings 14 and 16.

The axial length of the slots 36 and 38 in the ball head 12 is greater than the size of the pins 18 and 20 so as to permit rocking movement of each pin in its respective slot about the axis of the other pin during rotation of the shafts 40 and 42 when angularly disposed relative to each other. The compensating ring 14 is swiveled on an outer annular surface on the socket member 10 on one side of the rib 32, while the other compensating ring 16 is swiveled on a similar annular surface on the socket member 10 on the opposite side of the rib 32.

The socket member 10 with the rings 14 and 16 assembled thereon is disposed within the cover 26 as shown in such a manner that the compensating rings 14 and 16 are free to rotate about their own axes relative to each other and relative to the socket member 10 to the limited extent permitted by the compensating levers 22. The cover nut 28 threadedly secured in the cover 26 secures the socket member 10 in assembled relation with the cover 26, the nut 28 reacting against a shoulder 52 formed on the socket member 10 while permitting the rings 14 and 16 to turn freely. The cover 26 secures the ball head 12 in the socket 44, and the boot 30 forms a seal between the cover 26 and the shaft 40. The joint thus is self-contained and requires no supporting structure for the joint, as is characteristic of many of the prior art joints of the constant velocity type. The interior of the joint is charged with a suitable supply of lubricant for lubricating the working parts thereof.

Each of the compensating levers 22 is mounted in a bearing member 24 which is journaled in a socket 54 in the flange 32. As shown in Figs. 2 and 4, the ends of the levers 22 react on the rings 14 and 16, the ring 14 being provided with a series of circular holes or sockets 56 and the ring 16 being provided with a series of circular holes or sockets 58. The end 60 of each lever 22 which projects into a hole 56 is spherical so as to be free to swivel therein, and the end 62 of the lever which extends into a hole 58 in the ring 16 is spherical so as to be free to swivel in the hole 58. The bearing member 24 is free within limits to swivel and to float radially in its socket 54. As previously indicated, the compensating rings 14 and 16 are free to swivel or turn relative to the socket member 10 and the flange or rib 32.

The scissoring action of the pins 18 and 20 when the joint is rotating with the shafts 40 and 42 arranged at an angle relative to each other will cause the compensating rings 14 and 16 to oscillate relative to the rib 32 on the socket member 10. This oscillation of the compensating rings 14 and 16 is due to the fact that the angular velocity of the ends of the pins 18 and 20 is not constant. However, as the ring 16 accelerates the ring 14 decelerates and vice versa, and the arrangement of the levers 22 pivoted to the rib 32 and reacting on the rings 14 and 16 will compensate for the variations in angular velocity of the rings 14 and 16 and thereby transmit the average velocity of the rings 14 and 16 to the rib 32 and the socket member 10, thereby driving the socket member 10 at a constant velocity relative to that of the ball head 12. The action of the joint will be the same regardless of whether the shaft 40 is the driving or the driven shaft.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. Universal joint construction comprising a socket member and a ball head swiveled in said socket member, said ball head having a pair of intersecting, axially extending, diametral slots therein disposed at right angles to each other and to the axis of rotation of said ball head, said socket member having a series of slots therein, a pin extending through one of said slots in said ball head and having its ends projecting into certain of said slots in said socket member, a second pin extending through the other of said slots in said ball head and having its ends projecting into other slots in said socket member, said pins being arranged crosswise of each other and in a common plane, the width of said slots in said socket member, transversely of the axis of said socket member, being greater than the size of the projecting ends of said pins so as to permit angular movement of the ends of said pins relative to said socket member, the axial length of said slots in said ball head being greater than the size of said pins so as to permit rocking movement of each pin in its respective slot about the axis of the other pin, a pair of compensating rings swiveled on said socket member, one of said pins having its ends secured to one of said rings and the other of said pins having its ends secured to the other of said rings, and levers pivoted to said socket member between said compensating rings, one end of each of said levers reacting on one of said rings and the other end of each of said levers reacting on the other of said rings.

2. Universal joint construction comprising a socket member and a ball head swiveled in said socket member, said ball head having a pair of intersecting, axially extending, diametral slots therein disposed at right angles to each other and to the axis of rotation of said ball head, said socket member having an annular flange provided with a series of radially extending slots therein, a pin extending through one of said slots in said ball head and having its ends projecting into certain of said slots in said socket member, a second pin extending through the other of said slots in said ball head and having its ends projecting into other slots in said socket member, said pins being arranged crosswise of each other, the width of said slots in said socket member, transversely of the axis of said socket member, being greater than the size of the projecting ends of said pins so as to permit angular movement of the ends of said pins relative to said socket member, the axial length of said slots in said ball head being greater than the size of said pins so as to permit rocking movement of each pin in its respective slot about the axis of the other pin, a pair of compensating rings swiveled on said socket member, one on each side of said flange, one of said pins having its ends secured to one of said rings and the other of said pins having its ends secured to the other of said rings, and levers pivoted to said flange between said compensating rings, one end of each of said levers reacting on one of said rings and the other end of each of said levers reacting on the other of said rings.

3. Universal joint construction comprising a body member and a ball head swiveled in said body member, said ball head having a pair of intersecting, axially extending, diametral slots therein disposed at right angles to each other and to the axis of rotation of said ball head, said body member having a series of slots therein, a pin extending through one of said slots in said ball head and having its ends projecting into certain of said slots in said body member, a second pin extending through the other of said slots in said ball head and having its ends projecting into other slots in said body member, said pins being arranged crosswise of each other and each of said pins being notched at its middle so as to accommodate the other of said pins and said notched portions of said pins being seated against each other so that said pins lie in a common plane, the width of said slots in said body member, transversely of the axis thereof, being greater than the size of the projecting ends of said pins so as to permit angular movement of the ends of said pins relative to said body member, the axial length of said slots in said ball head being greater than the size of said pins so as to permit rocking movement of each pin in its respective slot about the axis of the other pin, a pair of compensating rings swiveled on said body member, one of said pins having its ends secured to one of said rings and the other of said pins having its ends secured to the other of said rings, and levers pivoted to said body member between said compensating rings, one end of each of said levers reacting on one of said rings and the other end of each of said levers reacting on the other of said rings.

4. Universal joint construction comprising a body member and a ball head swiveled in said body member, said ball head having a pair of intersecting, axially extending, diametral slots therein disposed at right angles to each other and to the axis of rotation of said ball head, a pin extending through one of said slots in said ball head, a second pin extending through the other of said slots in said ball head, said pins being arranged crosswise of each other and so as to permit rocking movement of each pin in its respective slot about the axis of the other pin, a pair of spaced compensating rings swiveled on said body member, one of said pins having its ends secured to one of said rings and the other of said pins having its ends secured to the other of said rings, and levers pivoted to said body member between said compensating rings, one end of each of said levers reacting on one of said rings and the other end of each of said levers reacting on the other of said rings.

5. Universal joint construction comprising a socket member and a ball head swiveled in said socket member, said ball head having a pair of intersecting, axially extending, diametral slots therein disposed at right angles to each other and to the axis of rotation of said ball head, a pin extending through one of said slots in said ball head, a second pin extending through the other of said slots in said ball head, said pins being arranged in said ball head crosswise of each other and in a common plane and so as to permit rocking movement of each pin in its respective slot about the axis of the other pin, a pair of compensating rings swiveled on said socket member, one of said pins having its ends secured to one of said rings and the other of said pins having its ends secured to the other of said rings, and levers pivoted to said socket member between said compensating rings, one end of each of said levers reacting on one of said rings and the other end of each of said levers reacting on the other of said rings.

GEORGE E. DUNN.

References Cited in the file of this patent

UNITED STATES PATENTS

| Number | Name | Date |
|---|---|---|
| 1,498,678 | Chavrier | June 24, 1924 |
| 1,847,677 | Sternbergh | Mar. 1, 1932 |

FOREIGN PATENTS

| Number | Country | Date |
|---|---|---|
| 250,987 | Switzerland | 1948 |